(12) United States Patent
Komori et al.

(10) Patent No.: US 7,868,575 B2
(45) Date of Patent: Jan. 11, 2011

(54) APERTURE DRIVING APPARATUS AND PROJECTION TYPE IMAGE DISPLAY APPARATUS

(75) Inventors: Noriyuki Komori, Tokyo (JP); Atsushi Michimori, Tokyo (JP); Kazumasa Nakai, Tokyo (JP); Koji Nakanishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 430 days.

(21) Appl. No.: 12/071,236

(22) Filed: Feb. 19, 2008

(65) Prior Publication Data

US 2008/0218109 A1 Sep. 11, 2008

(30) Foreign Application Priority Data

Mar. 9, 2007 (JP) ............................. 2007-059885

(51) Int. Cl.
*G05B 11/01* (2006.01)
(52) U.S. Cl. ...................................... 318/560; 318/798
(58) Field of Classification Search ................ 318/560, 318/800, 798, 799
See application file for complete search history.

(56) References Cited

U.S. PATENT DOCUMENTS

| | | | | |
|---|---|---|---|---|
| 5,109,310 A | * | 4/1992 | Ohkjita et al. | 360/264.3 |
| 5,473,409 A | * | 12/1995 | Takeda et al. | 355/53 |
| 6,052,357 A | * | 4/2000 | Ogawa et al. | 720/662 |
| 7,287,864 B2 | * | 10/2007 | Shirasu et al. | 353/97 |
| 2007/0008502 A1 | * | 1/2007 | Lee et al. | 353/97 |

FOREIGN PATENT DOCUMENTS

| | | |
|---|---|---|
| JP | 3-75061 A | 3/1991 |
| JP | 3-84527 A | 4/1991 |
| JP | 10-21568 A | 1/1998 |
| JP | 2001-155355 A | 6/2001 |
| JP | 2002-367239 A | 12/2002 |
| JP | 2004-139717 A | 5/2004 |
| JP | 2005-17810 A | 1/2005 |
| JP | 2005-346750 A | 12/2005 |
| JP | 2006-259698 A | 9/2006 |
| JP | 2006-284995 A | 10/2006 |

* cited by examiner

*Primary Examiner*—Rina I Duda
(74) *Attorney, Agent, or Firm*—Birch, Stewart, Kolasch and Birch, LLP

(57) ABSTRACT

An aperture driving apparatus includes a swing unit and a stationary unit. The swing unit includes an aperture plate that partially blocks a light, a coil that constitute a voice coil motor for obtaining a driving force for driving the aperture driving plate, and a swing arm that supports the aperture plate and the coil and has a bearing portion between the aperture plate and the coil. The stationary unit includes a swing shaft that engages the bearing portion and swingably supports the swing arm about a swing axis, and a magnet and a yoke that constitute the voice coil motor together with the coil. A control unit of the aperture driving apparatus controls the swing angle of the swing arm using a closed-loop control technique. In the direction of the swing axis, the position of a center of gravity of the swing unit is substantially aligned with a position at which the driving force is applied to the coil.

9 Claims, 9 Drawing Sheets

# US 7,868,575 B2

APERTURE DRIVING APPARATUS AND PROJECTION TYPE IMAGE DISPLAY APPARATUS

BACKGROUND OF THE INVENTION

This invention relates to an aperture driving apparatus using a voice coil motor, and a projection type image display apparatus using the aperture driving apparatus.

An aperture driving apparatus is used in an imaging apparatus to adjust the amount of light. Recently, such an aperture driving apparatus is not only used in the imaging apparatus, but is also used in a projection type image display apparatus that modulates the light using a light modulating unit (for example, a liquid crystal display panel or a digital micro mirror device) and projects the modulated light onto a screen. In general, the aperture driving apparatus includes an aperture plate made of metal on which a V-shaped cutout is formed, and is configured to partially block the light at the V-shaped cutout to thereby change the amount of light.

Generally, a voice coil motor is used as an actuator of the aperture driving apparatus (see, for example, Patent Document No. 1). In the voice coil motor disclosed in Patent Document No. 1, a coil is mounted to a movable part that swings together with the aperture plate. The coil is wound in a fan-shape so that the winding axis is aligned with the direction of a swing axis of the movable part. Further, a pair of magnets are disposed on both sides of the coil in the direction of the swing axis.

Patent Document No. 1: Japanese Laid-Open Patent Publication No. 2006-284995 (paragraphs 0032-0034 and FIG. 5).

In the above described aperture driving apparatus, there is a problem that the dimension of the fan-shaped coil in the swing direction (i.e., in the direction perpendicular to the swing axis) is large. Therefore, there is proposed a voice coil motor in which a coil is wound in a rectangular shape so that the direction of the winding axis is substantially perpendicular to the swing axis. In such a voice coil motor, a yoke (i.e., a center yoke) made of metal is disposed in the inside of a hollow portion of the coil, a pair of magnets are symmetrically disposed on both sides of the coil in the direction of the swing axis, and a pair of back yokes are disposed on the backsides (i.e., outside) of the respective magnets. The center yoke, the back yokes and the magnets constitute a magnetic path to thereby enhance the efficiency of the voice coil motor.

However, although such a configuration contributes to the reduction of the dimension in the swing direction, the dimension in the direction of the swing axis becomes large since a pair of magnets are disposed on both sides of the coil in the direction of the swing axis.

In order to reduce the dimension of the aperture driving apparatus in the direction of the swing axis, it is considered to dispose only one magnet on only one side of the coil in the direction of the swing axis.

However, with such an asymmetric configuration in which the magnet is disposed on only one side of the coil in the direction of the swing axis, an unnecessary torque may be generated in a direction different from a direction for swinging the movable part. Therefore, there is a problem that vibration may occur when the position of the aperture plate is controlled using a closed-loop control technique.

SUMMARY OF THE INVENTION

The present invention is intended to solve the above described problems, and an object of the present invention is to provide an aperture driving apparatus capable of suppressing vibration when a closed-loop controlling is performed.

The present invention provides an aperture driving apparatus including a swing unit and a stationary unit. The swing unit includes an aperture plate that partially blocks a light, a coil that constitute a voice coil motor for obtaining a driving force for driving the aperture driving plate, and a swing arm that supports the aperture plate and the coil and has a bearing portion between the aperture plate and the coil. The stationary unit includes a swing shaft that engages the bearing portion and swingably supports the swing arm about a swing axis, and a magnet and a yoke that constitute the voice coil motor together with the coil. The aperture driving apparatus further includes an angle sensor that detects the swing angle of the swing arm, an evaluating unit that determines an evaluation value used for determining the swing angle by which the swing arm is to be swung, and a control unit that determines the swing angle by which the swing arm is to be swung according to an output of the angle sensor and the evaluation value, to thereby control the swing angle of the swing arm using a closed-loop control technique. In the direction of the swing axis, the position of a center of gravity of the swing unit is substantially aligned with a position at which the driving force is applied to the coil.

With such an arrangement, in the direction of the swing axis, the position of the center of gravity of the swing unit is substantially aligned with the position at which the driving force is applied to the coil, and therefore it becomes possible to prevent the generation of the torque in a direction different from a direction for swinging the swing arm. Accordingly, the generation of vibration can be prevented when the closed-loop control is performed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Embodiments of the present invention will be described with reference to the attached drawings.

Embodiment 1

Figure 1:
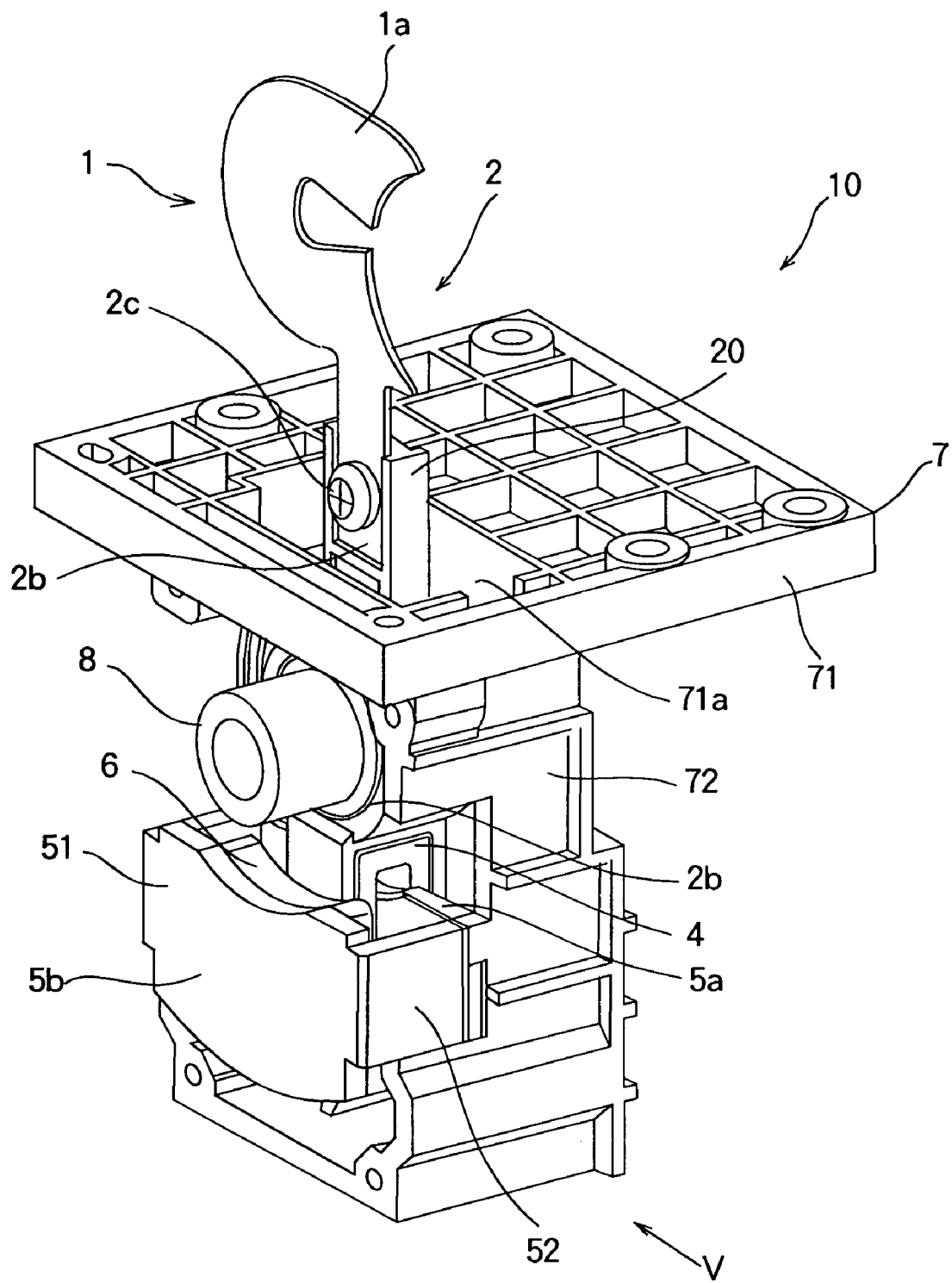
FIG. 1 is a perspective view showing the configuration of an aperture driving apparatus according to Embodiment 1 of the present invention.
Figure 2:
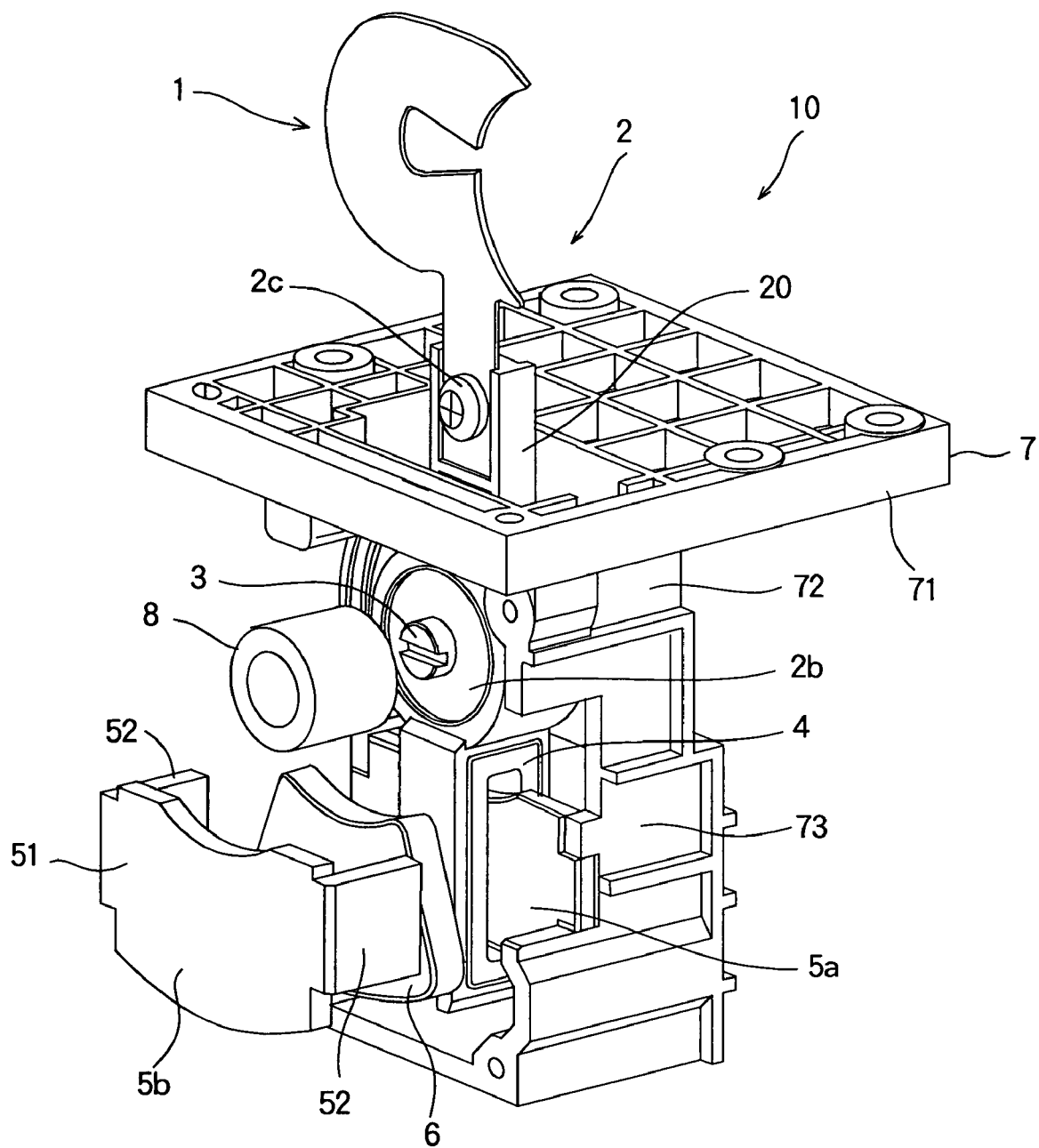
FIG. 2 is an exploded perspective view showing the configuration of the aperture driving apparatus according to Embodiment 1 of the present invention.
Figure 3:
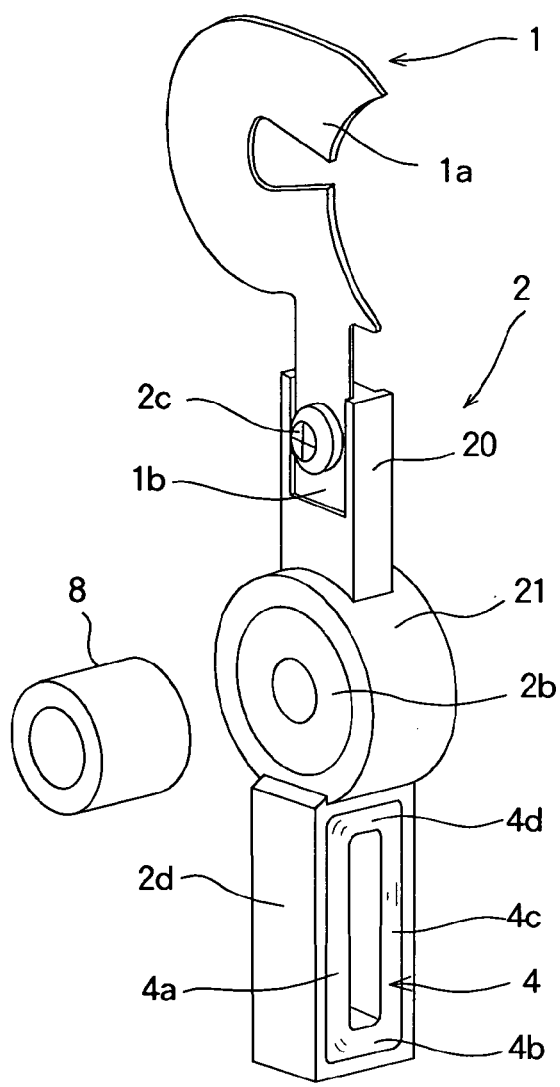
FIG. 3 is an exploded perspective view showing the configuration of a swing arm of the aperture driving apparatus according to Embodiment 1 of the present invention.

FIGS. 1 and 2 are a perspective view and an exploded perspective view showing the configuration of an aperture driving apparatus 10 according to Embodiment 1. FIG. 3 is a perspective view showing the configuration of a swing unit 2 of the aperture driving apparatus 10. As shown in FIGS. 1 and 2, the aperture driving apparatus 10 includes an aperture plate 1 that partially blocks a light to thereby change the amount of light, a swing arm 20 to which said aperture plate 1 is mounted, and a frame 7 that supports said aperture plate 1 and the swing arm 20. The aperture plate 1 has an aperture blade 1a at the tip end thereof, which partially blocks the light (not shown). Further, the aperture plate 1 is fixed to the swing arm 20 at the tail end thereof.

Figure 5:
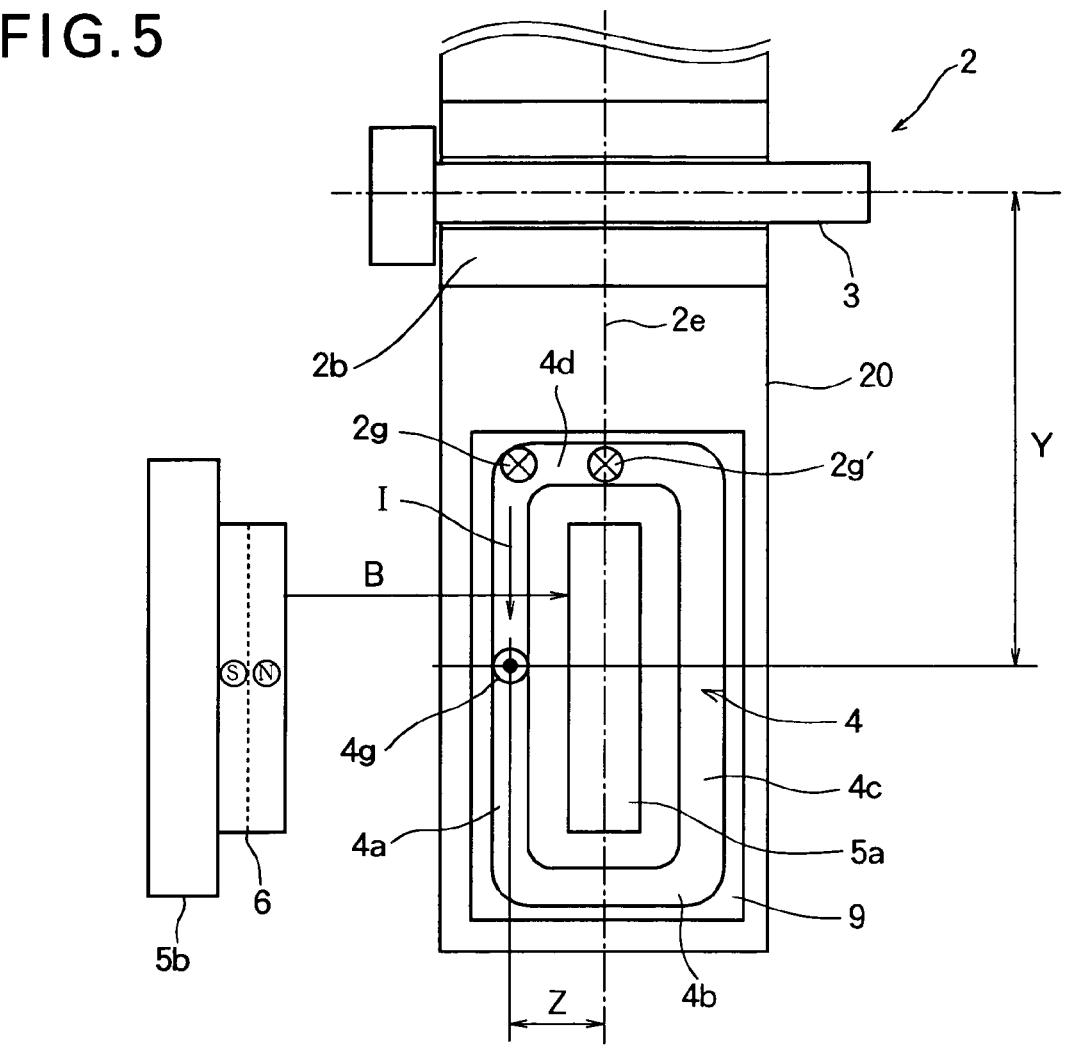
FIG. 5 is a schematic view for illustrating a driving force generated by the voice coil motor of the aperture driving apparatus according to Embodiment 1 of the present invention.

As shown in FIG. 3, the swing arm 20 has a shape elongated in one direction. The above described aperture plate 1 is fixed to an end of the swing arm 20 in the longitudinal direction by means of a screw 2c. A coil 4 constituting a voice coil motor is fixed to the other end of the swing arm 20 by means of an adhesive material 9 (FIG. 5). The swing arm 20 has a bearing portion 2b between the aperture plate 1 and the coil 4, and the bearing portion 2b engages a swing shaft 3 (described later). The bearing portion 2b can be integrally formed with the swing arm 20, or can be composed of a separate ball bearing or slide bearing mounted to a cylindrical part 21 of the swing arm 20.

A balancer 8 which is a cylindrical member is mounted to the bearing portion 2b of the swing arm 20. The function of the balancer 8 will be described later. The swing arm 20, the aperture plate 1, the coil 4 and the balancer 8 constitute a swing unit 2 as a movable part.

As shown in FIG. 2, a swing shaft 3 is mounted to the frame 7. The swing shaft 3 swingably supports the swing arm 20 and defines a swing axis (i.e., a center of swing) of the swing arm 20. An end of the swing shaft 3 in the axial direction is fixed to the frame 7. Further, a magnet 6 and yokes 5a and 5b are mounted to the frame 7. The magnet 6, the yokes 5a and 5b and the above described coil 4 constitute the voice coil motor. The frame 7, the magnet 6 and the yokes 5a and 5b constitute a stationary unit.

The frame 7 includes a fixing plate 71 fixed to a predetermined portion of an apparatus (such as a projection type image display apparatus) to which the aperture driving apparatus 10 is mounted, and a supporting portion 72 protruding from one surface side (i.e., lower side in FIGS. 1 and 2) of the fixing plate 71. The above described swing shaft 3 is fixed to the supporting portion 72 of the frame 7. Further, the yoke 5a is substantially in the form of a plate, and both lateral ends (i.e., ends in the direction of a circumference having the center on the swing shaft 3) of the yoke 5a are fixed to both side walls 73 of the supporting portion 72 of the frame 7. The swing arm 20 penetrates an opening 71a formed on the fixing plate 71 of the frame 7, and protrudes to the side opposite to the supporting portion 72 (i.e., protrudes into the not shown light path).

Figure 4:
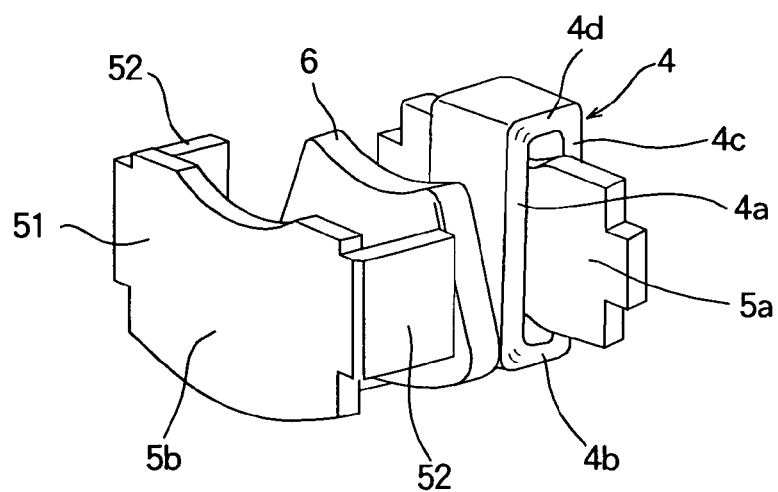
FIG. 4 is a schematic view showing the configuration of a voice coil motor of the aperture driving apparatus according to Embodiment 1 of the present invention.

FIG. 4 is a schematic view showing a configuration of the voice coil motor composed of the coil 4, the yokes 5a and 5b and the magnet 6. The coil 4 is wound in a rectangular shape so that the direction of the winding axis is perpendicular to the swing shaft 3. To be more specific, the coil 4 includes two coil parts 4a and 4c extending in the direction of the radius of a circle having the center on the swing shaft 3, and two coil parts 4b and 4d extending in the direction of the swing shaft 3.

The above described yoke (i.e., a center yoke) 5a in the form a plate is disposed in a hollow portion (i.e., a rectangular hole) inside the coil 4 so that the yoke 5a does not contact the coil 4. Further, the yoke (i.e., a back yoke) 5b is disposed on one side of the coil 4 in the direction of the swing shaft 3. The yoke 5b is rectangular C-shaped, and includes a flat plate portion 51 parallel to the yoke 5a, and a pair of extending portions 52 extending toward the yoke 5a from the lateral ends of the flat plate portion 51. The extending portions 52 of the yoke 5b are fixed to the lateral ends of the yoke 5a.

A magnet 6 is fixed to a surface of the yoke 5b on the side facing the yoke 5a (i.e., the side facing the coil 4). The magnet 6 is magnetized to have, for example, an S-pole on the surface facing the yoke 5b and an N-pole on the surface facing the yoke 5a. Therefore, the lines of magnetic force emitted from the N-pole of the magnet 6 pass the coil 4 to reach the yoke 5a, and further pass the yoke 5b (via the extending portions 52) to reach the S-pole of the magnet 6. In this regard, the direction of the magnetization of the magnet 6 can be such that, for example, the N-pole and the S-pole are disposed in the opposite manner.

FIG. 5 is a schematic view for illustrating the function of the voice coil motor as seen in the direction of the arrow V in FIG. 1. In FIG. 5, the magnetic flux is directed toward the yoke 5a from the N-pole of the magnet 6 (facing the yoke 5a) as indicated by an arrow B. When the current I flows through the coil 4 in the counterclockwise direction in FIG. 5, the coil part 4a of the coil 4 disposed between the magnet 6 and the yoke 5a is applied with a driving force in the direction of circumference having the center on the swing shaft 3 (i.e., to the near side in the direction perpendicular to the sheet of FIG. 5). With this driving force, the swing arm 20 swings about the swing shaft 3. In other words, the swing unit 2 including the swing arm 20 and the components mounted to the swing arm 20 swings about the swing shaft 3.

In contrast, the swing arm 20 is urged by a not shown return spring in the direction in which the swing arm 20 returns to its original position (i.e., the direction opposite to the driving force generated at the coil 4) in accordance with the swing angle from the original position. Therefore, the swing arm 20 stops at a position where the driving force (the electromagnetic force) applied to the coil 4 and the force of the return spring are balanced.

By controlling the current flowing through the coil 4, the position where the swing arm 20 stops is determined, to thereby control the amount of light blocked by the aperture plate 1. With this, the amount of light (i.e., the amount of projected light) can be adjusted. The moving amount of the aperture plate 1 is detected by detecting the swing angle of the swing arm 20 using an angle sensor 102 (FIG. 6).

Figure 6:
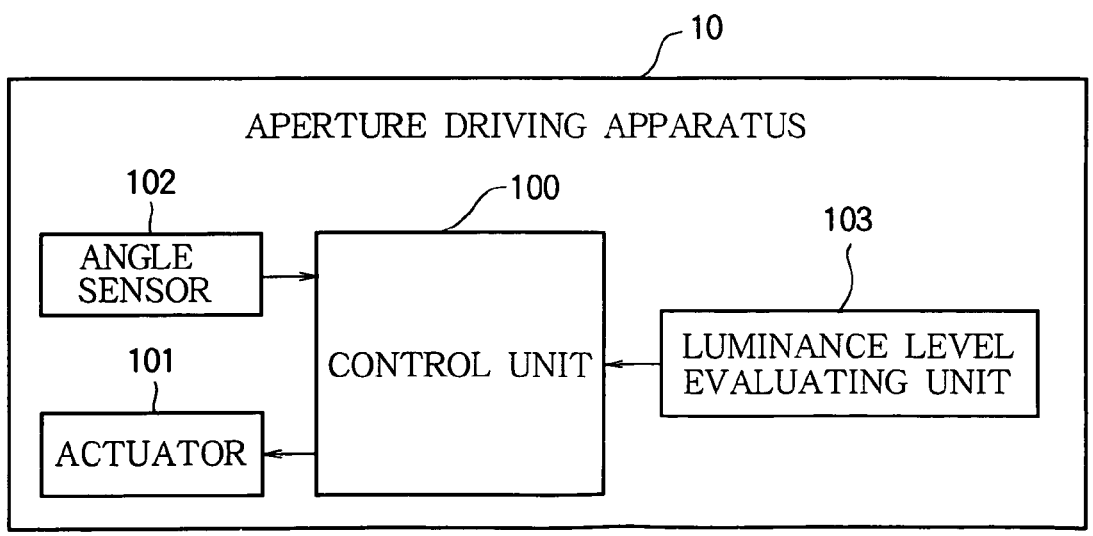
FIG. 6 is a block diagram showing an example of a control system of the aperture driving apparatus according to Embodiment 1 of the present invention.

FIG. 6 is a block diagram showing a control system of the aperture driving apparatus 10. The control system includes the above described voice coil motor (referred to as an actuator 101), an angle sensor 102 that detects the singing angle of the swing arm 20, a luminance level evaluating unit 103 (i.e., an evaluating unit) that evaluates the luminance of the illumination light of the projection type image display apparatus, and a control unit 100. The control unit 100 receives data of luminance value (i.e., an evaluation value) from the luminance level evaluating portion 103, and compares the luminance value with the output of the angle sensor 102 (indicating the swing angle of the swing arm 20) to thereby determine the current to be applied to the coil 4. When the current is applied to the coil 4, the above described driving force is generated, and the swing unit 2 (including the swing arm 20) stops at a position where the driving force and the force generated by the return spring are balanced.

Next, the vibration generated at the swing unit 2 will be described. A closed-loop control is performed in the control system shown in FIG. 6. To be more specific, when the swing unit 2 swings in excess of the swing angle corresponding to the current applied to the coil 4, the control unit 100 applies the current to the coil 4 to thereby swing the swing unit 2 in the reverse direction by the swing angle corresponding to the overrun in accordance with the swing angle (i.e., a swing position) of the swing unit 2 detected by the angle sensor 102.

If a gap between the swing shaft 3 and the bearing portion 2b is large, there is a tendency that the swing unit 2 swings in excess of the swing angle corresponding to the current applied to the coil 4, and vibration may easily be generated when the above described closed-loop control is performed. Therefore, it is preferable that the gap between the swing shaft 3 and the bearing portion 2b is as small as possible.

Here, while the swing unit 2 is swinging, vibration of the swing unit 2 may be developed if the swing unit 2 is applied with a force in a direction different from the swing direction of the swing unit 2. Therefore, in this embodiment, the cause of developing the vibration of the swing unit 2 is eliminated as follows.

A general swing arm 20 has substantially a symmetrical shape with respect to the center position in the direction of the swing shaft 3. Therefore, in FIG. 5, the position of a center of gravity 2g' of the swing unit 2 (including the swing arm 20) is generally on a center line 2e passing through the center position of the swing arm 20 in the direction of the swing shaft 3. In contrast, the magnet 6 is disposed on only one side of the coil 4 in the direction of the swing shaft 3, and therefore the driving force is applied to only the coil part 4a among the coil parts 4a through 4d of the coil 4. Therefore, the position 4g where the driving force is applied to the coil 4 (referred to as a driving force applying position 4g) is shifted from the above described position of the center of gravity 2g' by the distance Z in the direction of the swing shaft 3. Accordingly, when the current flows through the coil 4 to generate the driving force (electric magnetic force), an unnecessary torque having an arm length Z equal to a distance from the position of the center of gravity 2g' of the swing unit 2 to the driving force applying position 4g is generated, in addition to a torque having an arm length Y equal to a distance from the swing shaft 3 to the driving force applying position 4g. The unnecessary torque may develop the above described vibration.

Therefore, in this embodiment, the position of the center of gravity 2g of the swing unit 2 (with a balancer 8 described below) is substantially aligned with the driving force applying position 4g of the coil 4 in the direction of the swing shaft 3 (i.e., the arm length is substantially set to be zero), so as to prevent the generation of the unnecessary torque that is different from a torque required for swinging the swing unit 2 about the swing shaft 3.

As shown in FIGS. 1 through 3, a balancer 8 is mounted to the swing arm 20 for substantially aligning the position of the center of gravity 2g of the swing unit 2 with the driving force applying position 4g of the coil 4 in the direction of the swing shaft 3. The balancer 8 is disposed in the vicinity of the swing shaft 3 of the swing arm 20 and on the same side as the magnet 6 in the direction of the swing shaft 3. Further, the balancer 6 is, for example, a cylindrical member, and is mounted so as to surround the swing axis of the swing arm 20. The reason why the balancer 6 is provided in the vicinity of the swing shaft 3 of the swing arm 20 is to prevent the inertia moment of the swing unit 2 (including the swing arm 20) from being increased by the provision of the balancer 8.

In the above description, although the driving force (the electromagnetic force) of the voice coil motor is applied to the entire body of the coil part 4a of the coil 4 facing the magnet 6, it can be considered that the driving force is applied to a point (i.e., a point at the center of the coil part 4a in the direction of the swing shaft 3 and at the center of the coil part 4a in the direction of the radius of a circle having the center on the swing shaft 3) in concentration. This point is defined as the driving force applying position 4g of the coil 4 as shown in FIG. 5.

As described above, in this embodiment, the position of the center of gravity 2g of the swing unit 2 is substantially aligned with the driving force applying position 4g of the coil 4 in the direction of the swing shaft 3. With such a configuration, it becomes possible to prevent the generation of the unnecessary torque, and to eliminate the cause of developing the vibration (when the position of the aperture plate 1 is controlled in a closed-loop control technique).

Further, the magnet 6 is disposed on only one side of the coil 4 in the direction of the swing shaft 3, and therefore the dimension of the aperture driving apparatus 10 can be reduced in the direction of the swing shaft 3.

Furthermore, the balancer 8 is mounted to the swing arm 20 on the same side as the magnet 6 in the direction of the swing shaft 3, and therefore it becomes easy to accomplish the configuration in which the position of the center of gravity 2g of the swing unit 2 is substantially aligned with the driving force applying position 4g of the coil 4.

In addition, the balancer 8 has a cylindrical shape and is provided in the vicinity of the swing shaft 3, and therefore the inertia moment of the swing unit 2 can be reduced.

Further, the coil 4 is wound to have coil parts 4a and 4b extending in the direction perpendicular to the swing shaft 3, the yoke 5a is disposed between the coil parts 4a and 4b, and the yoke 5b is disposed to sandwich the magnet 6 with the coil part 4a. Therefore, the aperture driving apparatus 10 can be miniaturized in the swing direction and in the direction of the swing shaft.

Figure 7:
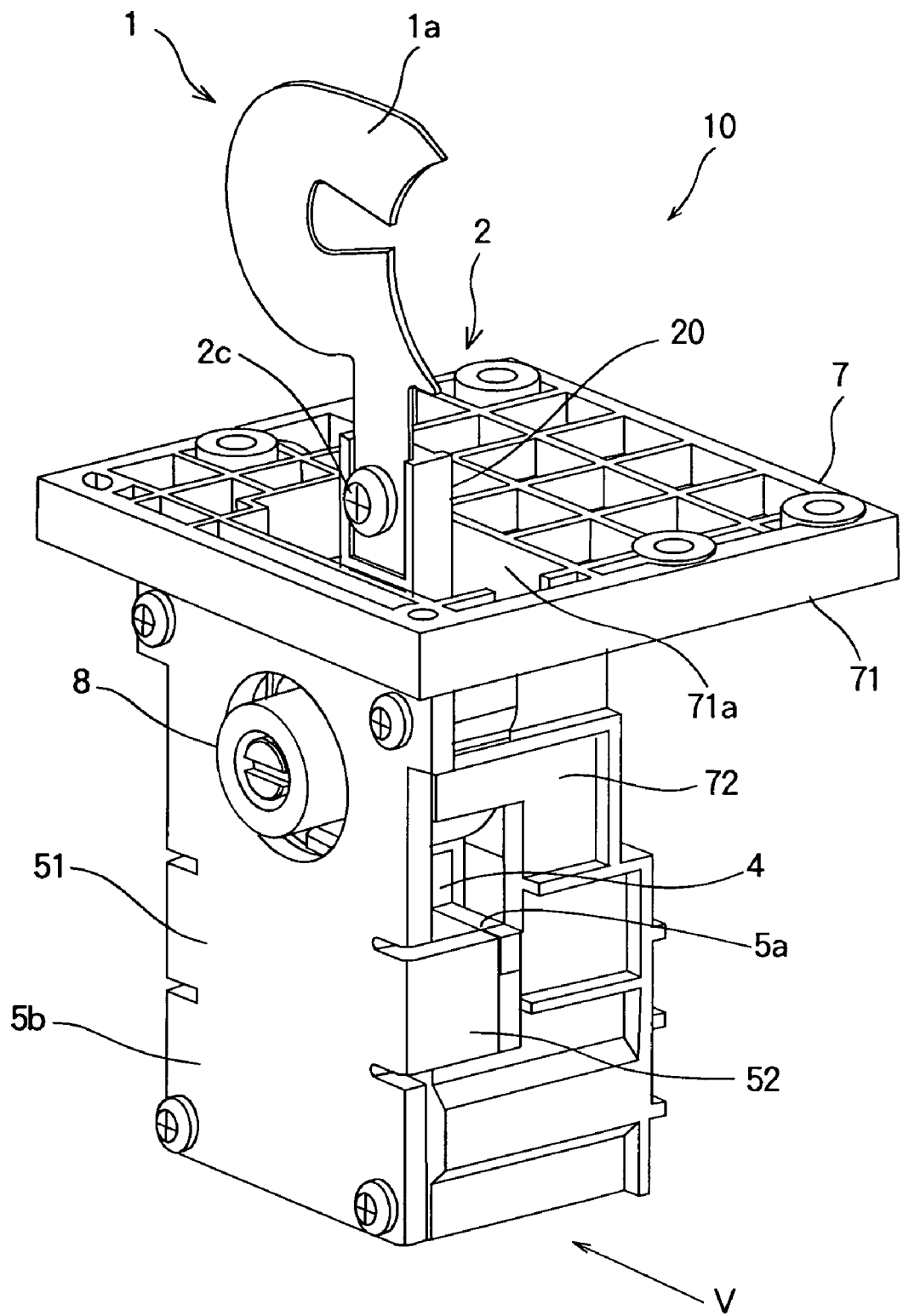
FIG. 7 is a perspective view showing a configuration example of the aperture driving apparatus according to Embodiment 1 of the present invention.

In this regard, although the aperture driving apparatus 10 shown in FIGS. 1 and 2 has no cover on the yoke 5b side of the frame 7, it is also possible to employ the configuration in which the yoke 5b also functions as a cover of the frame 7 as shown in FIG. 7. The employment of the configuration shown in FIG. 7 has no affect on the performance of the voice coil motor, but contributes to reduction in the number of parts compared with the configuration in which an exclusive cover (separate from the yoke 5b) is provided. In FIG. 7, the yoke 5b has a hole at a portion corresponding to the balancer 8. However, if the balancer 8 and the yoke 5b have shapes and dimensions so that the balancer 8 and the yoke 5b do not interfere with each other, the hole needs not to be formed.

Further, the existence of the hole does not affect the performance of the voice coil motor.

Embodiment 2

Next, Embodiment 2 of the present invention will be described. In the above described Embodiment 1, the description has been made to the configuration in which the balancer 8 is mounted to the swing arm 20. In contrast, in Embodiment 2, the swing arm 22 has a shape such that the position of the center of gravity of the swing unit 2 is substantially aligned with the driving force applying position of the coil 4 in the direction of the swing shaft 3.

Figure 8:
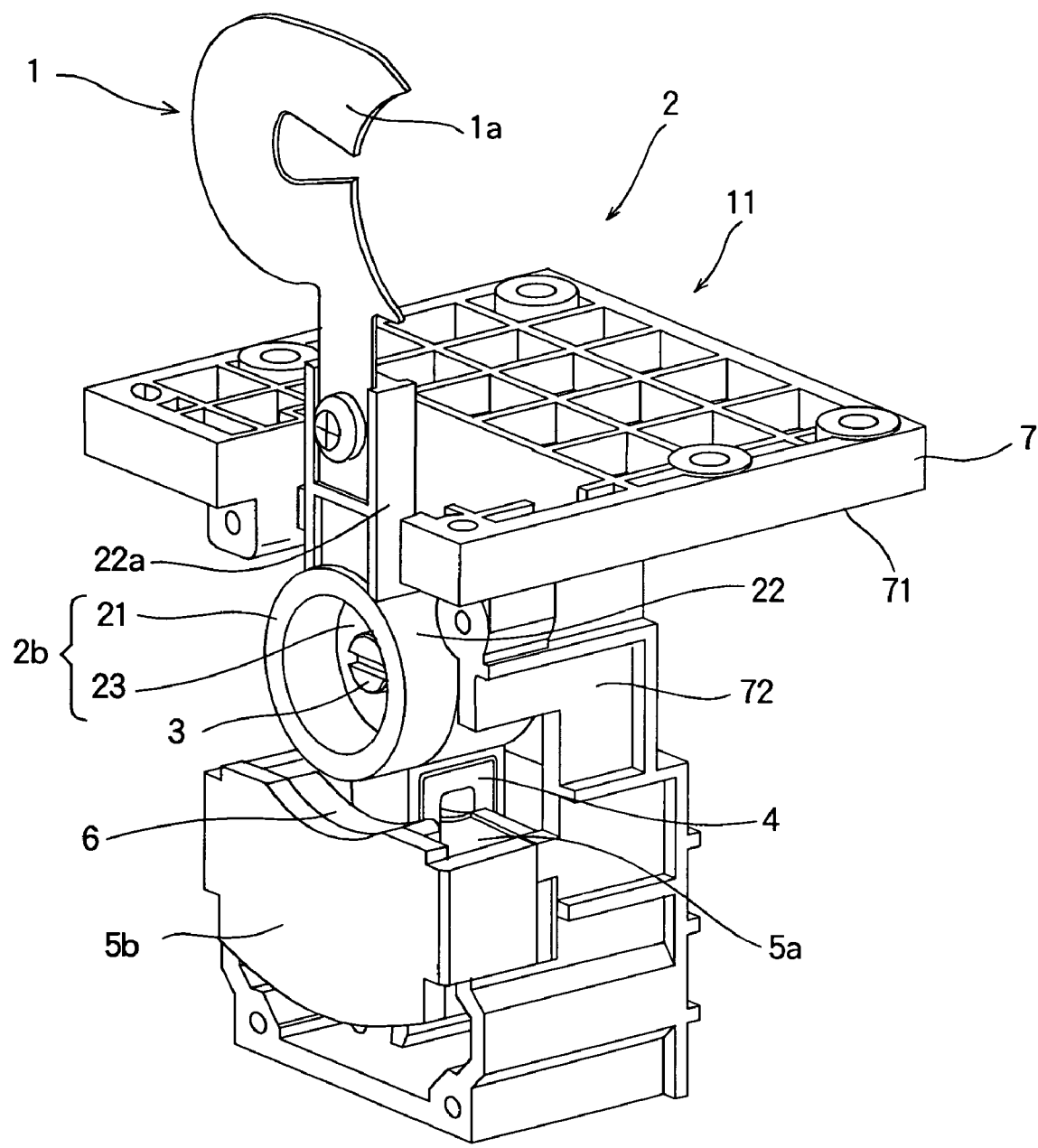
FIG. 8 is a perspective view showing the configuration of an aperture driving apparatus according to Embodiment 2 of the present invention.

FIG. 8 is a perspective view showing an aperture driving apparatus according to Embodiment 2. In FIG. 8, components that are the same as those described in Embodiment 1 (FIGS. 1 through 6) are assigned the same reference numerals. Further, in FIG. 8, the fixing plate 71 of the frame 7 is illustrated in a cutaway manner.

As shown in FIG. 8, a swing arm 22 of the aperture driving apparatus 11 of Embodiment 2 has a bearing portion 2b composed of a bearing 23 and a cylindrical portion 21, and the cylindrical portion 21 has a shape that protrudes to the same side as the magnet 6 in the direction of the swing shaft 3. Therefore, the swing unit 2 (the swing arm 22, the bearing 23, the aperture plate 1 and the coil 4) has a structure such that a part of the swing arm 22 from the cylindrical portion 21 to the aperture plate 1 protrudes to the side (i.e., left in FIG. 8) on which the magnet 6 is disposed.

With a structure of the swinging unit 2 in which a part of the swing arm 22 from the cylindrical portion 21 to the aperture plate 1 protrudes to the magnet 6 side, the position of the center of gravity of the swing unit 2 can substantially be aligned with the driving force applying position of the coil 4 in the direction of the swing shaft 3. Other components of the aperture driving apparatus of Embodiment 2 are the same as those of Embodiment 1. The bearing 23 and the cylindrical portion 21 (constituting the bearing portion 2b) can be integrally formed with each other. Further, it is also possible to employ the structure shown in FIG. 7.

As described above, according to Embodiment 2, the position of the center of gravity of the swing unit 2 can substantially be aligned with the driving force applying position of the coil 4 in the direction of the swing shaft 3, and therefore it becomes possible to reduce the vibration when the position of the aperture is controlled using a closed-loop control technique. Additionally, in Embodiment 2, it is not necessary to mount the balancer 8 (see FIG. 1) as a separate member to the swing arm 22, and therefore the assembling process can be simple, compared with Embodiment 1.

Embodiment 3

Next, Embodiment 3 of the present invention will be described. In the above described Embodiment 1, the balancer 8 is mounted to the swing arm 20 for substantially aligning the position of the center of gravity of the swing unit 2 with the driving force applying position. In the above described Embodiment 2, the swing arm 20 has a shape such that the position of the center of gravity of the swing unit 2 is substantially aligned with the driving force applying position. In contrast, in Embodiment 3, a bearing is mounted to a position of a swing arm 32 so that the position of the center of gravity of the swing unit 2 is substantially aligned with the driving force applying position.

Figure 9:
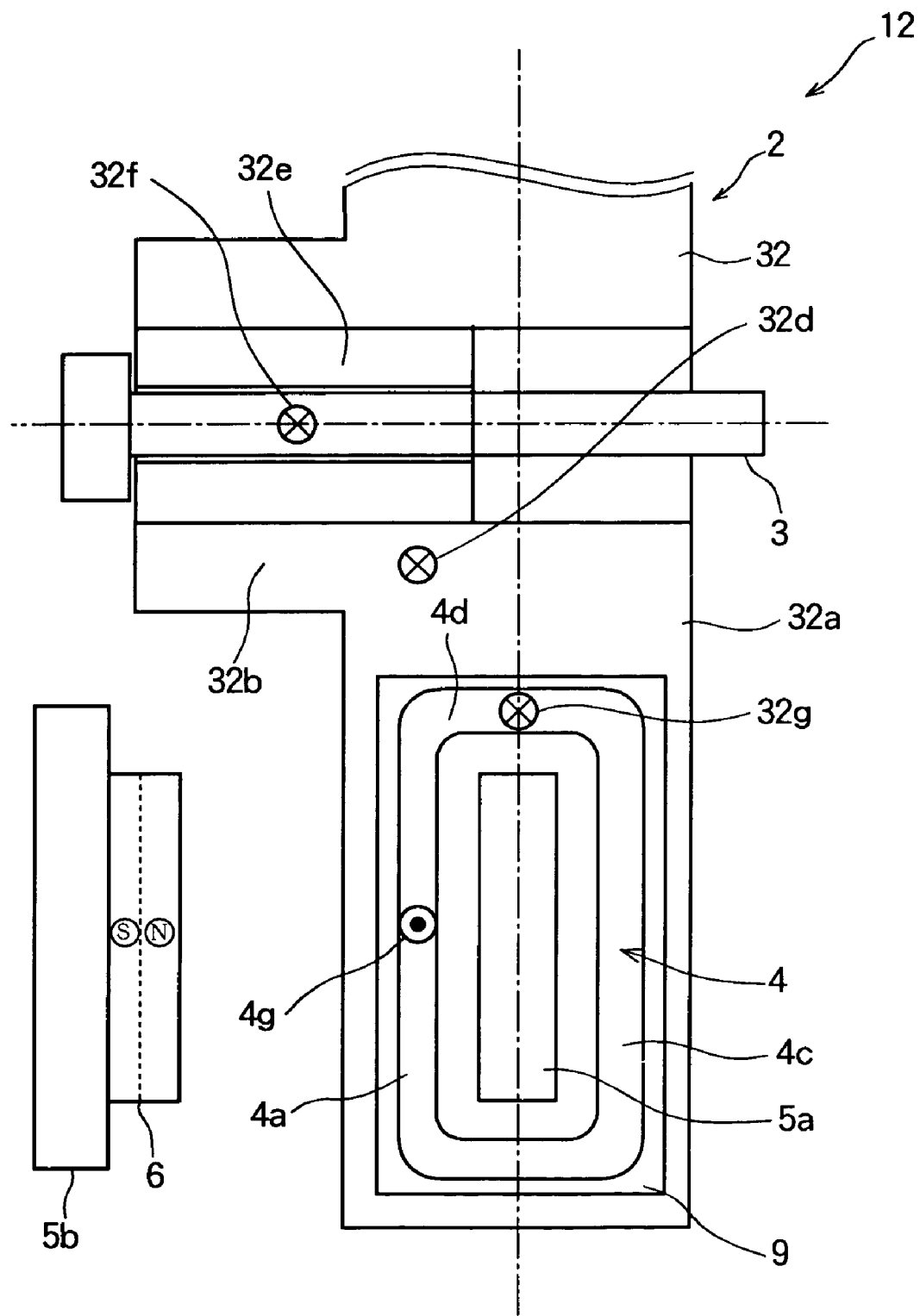
FIG. 9 is a perspective view showing the configuration of an aperture driving apparatus according to Embodiment 3 of the present invention.

As shown in FIG. 9, an aperture driving apparatus 12 of Embodiment 3 includes a swing arm 32 having a bearing mounting portion 32b to which a bearing 32e is mounted. The bearing mounting portion 32b has a shape protruding to the side on which the magnet 6 is disposed (i.e., protruding to the left in FIG. 9). The bearing 32e is mounted in a portion (of the bearing mounting portion 32b) protruding toward the magnet 6 side.

The heaviest component among the components of the swing unit 2 (including the swing arm 32) is the coil generally made of copper. However, if a bearing made of metal (for example, a ball bearing, an oil retaining bearing or the like) is used as the bearing 32e, the position of the center of gravity 32d of the swing unit 2 can substantially be aligned with the driving force applying position 4g of the coil 4 in the direction of the swing shaft 3 by positioning the bearing 32e to a position shifted to the magnet 6 side.

In other words, in FIG. 9, the position of the center of gravity 32f of the bearing 32e is shifted to the magnet side 6 with respect to the position of the center of gravity 32g of a part of the swing unit 2 except the bearing 32e, so that the position of the center of gravity 32d of the swing unit 2 is substantially aligned with the driving force applying position. Other components of the aperture driving apparatus of Embodiment 3 are the same as those of Embodiment 1. Further, it is also possible to employ the structure shown in FIG. 7.

As described above, in Embodiment 3, the position of the center of gravity 32d of the swing unit 2 (the swing arm 32, the bearing 32e, the aperture plate 1 and the coil 4) is substantially aligned with the driving force applying position of the coil 4 in the direction of the swing shaft 3 due to the shape of the bearing mounting portion 32b of the swing arm 32 and the position of the bearing 32e. Accordingly, as in Embodiments 1 and 2, it becomes possible to reduce the vibration when the swing arm 32 is controlled in the closed-loop control technique.

In this regard, in the above described Embodiments 1 through 3, the position of the center of gravity 2g of the swing unit 2 is described to be "substantially" aligned with the driving force applying position 4g of the coil 4 in the direction of the swing shaft 3. This does not only indicates that the position of the center of gravity 2g and the driving force applying position 4g are perfectly aligned with each other, but also indicates that the position of the center of gravity 2g and the driving force applying position 4g are shifted from each other in a range in which a vibration of the swing unit 2 is not developed during the closed-loop control.

Embodiment 4

Next, Embodiment 4 of the present invention will be described. Embodiment 4 relates to a liquid crystal display (LCD) projector as a projection type image display apparatus to which the aperture driving apparatus according to Embodiment 1, 2 or 3 is applied.

Figure 10:
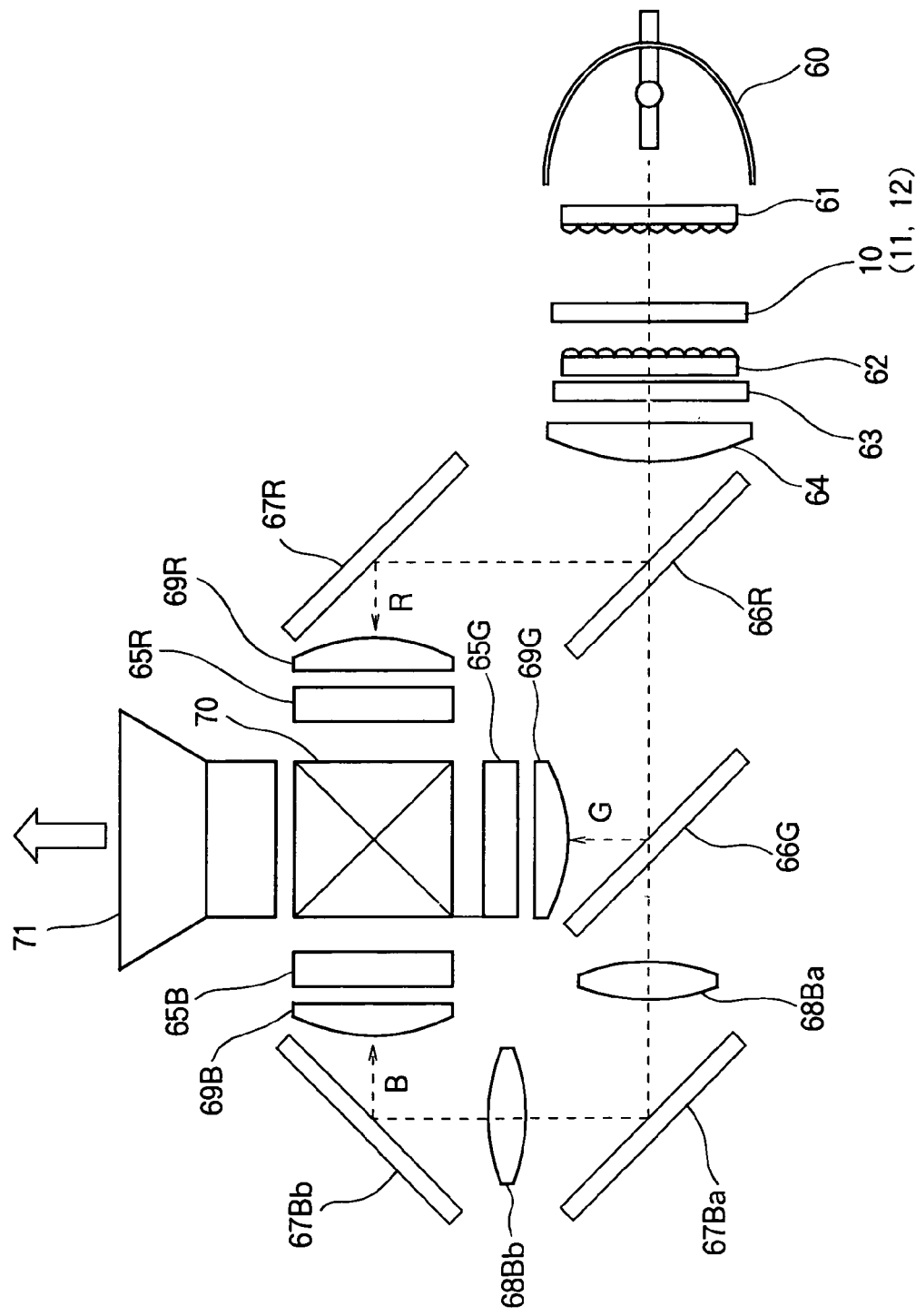
FIG. 10 shows a basic configuration of a liquid crystal display projector according to Embodiment 4 of the present invention.

FIG. 10 shows a basic configuration of the LCD projector according to Embodiment 4. The LCD projector includes a lamp 60 as a light source. Along the proceeding direction of the light emitted by the lamp 60, a first lens array 61, the aperture driving apparatus 10 (11, 12) according to Embodiment 1, 2 or 3, a second lens array 62, a polarization conversion element 63, a superimposing lens 64 and a dichroic mirror 66R are disposed.

Along the proceeding direction of the light reflected by the dichroic mirror 66R, a total reflection mirror 67R, a field lens 69R and an LCD panel 65R are disposed. Along the proceeding direction of the light passing through the dichroic mirror 66R, a dichroic mirror 66G is disposed. Along the proceeding direction of the light reflected by the dichroic mirror 66G, a filed lens 69G and an LCD panel 65G are disposed. Along the proceeding direction of the light passing through the dichroic mirror 66G, a relay lens 68Ba, a total reflection mirror 67Ba, a relay lens 68Bb, a total reflection mirror 67Bb, a field lens 69B and an LCD panel 65B are disposed.

On the exit side of the LCD panels 65R, 65G and 65B, a cross prism 70 (i.e., a combining unit) is disposed, which combines the lights emitted by the LCD panels 65R, 65G and 65B. On the exit side of the cross prism 70, a projection optical system (i.e., a projection unit) 71 is disposed, which projects the light combined by the cross prism 70 onto a not shown screen.

In the LCD projector configured as above, the light emitted by the lamp 60 is divided by the first lens array 61 into a plurality of light fluxes, and incident on the polarization conversion element 63 via the second lens array 62. The polarization conversion element 63 converts the incident light into the linearly-polarized light having the same polarizing directions. The linearly-polarized light is incident on the superimposing lens 64, and then incident on the dichroic mirror 66R. The dichroic mirror 66R only reflects the red-component light, and transmits the other light. The reflected red-component light is further reflected by the total reflection mirror 67R, passes the field lens 69R and is incident on the LCD panel 65R.

Similarly, the dichroic mirror 66G only reflects the green-component light, and transmits other light (i.e., the blue-component light). The reflected green-component light passes the field lens 69G and is incident on the LCD panel 65G. The blue-component light passes the relay lens 68Ba, is reflected by the total reflection mirror 67Ba, passes the relay lens 6BBb, is reflected by the total reflection mirror 67Bb, passes the field lens 69B and is incident on the LCD panel 65B. The LCD panels 65R, 65G and 65B function as light modulating units.

Lights of three colors emitted by the LCD panels 65R, 65G and 65B are combined by the cross prism 70, and projected by the projection optical system 71 onto a not shown screen in the direction shown by an arrow 72 in FIG. 10.

In the LCD projector of Embodiment 4, the aperture driving apparatus 10 (11, 12) is disposed on the exit side of the first lens array 61, and is used to adjust the amount of light emitted by the lamp 60. Since the amount of light is adjusted by the aperture driving apparatus 10 (11, 12), it becomes possible to correctly project an image ranging from a bright scene to a dark scene.

Embodiment 5

Next, Embodiment 5 of the present invention will be described. Embodiment 5 relates to a rear projection apparatus as a projection type (to be more specific, a rear-projection type) image display apparatus to which the aperture driving apparatus according to Embodiment 1, 2 or 3 is applied.

Figure 11:
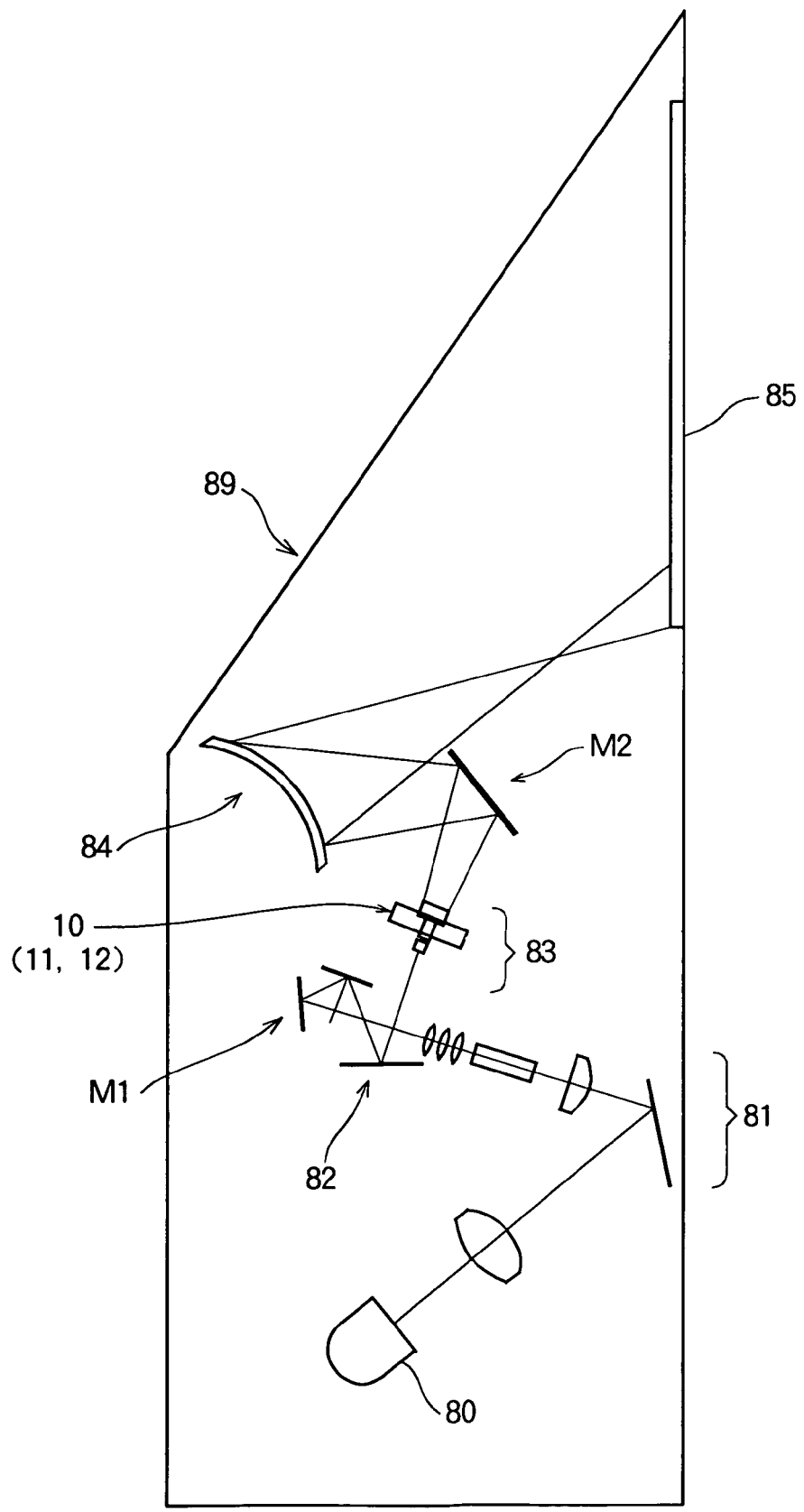
FIG. 11 shows a basic configuration of a rear projection apparatus according to Embodiment 5 of the present invention.

FIG. 11 shows a basic configuration of the rear projection apparatus according to Embodiment 5. The rear projection apparatus (for example, the rear projection television) has a frame 89 and a lamp 80 (as a light source) housed in the frame 89. Along the proceeding direction of the light emitted by the lamp 80, an illumination optical system 81, a reflection mirror group M1, a digital micro mirror device (DMD) 82 as an example of a reflection type image forming element, a projection optical system 83, a reflection mirror M4, an aspherical mirror 84 and a screen 85.

The light emitted by the lamp 80 passes the illumination optical system 80, and is shone on the surface of the digital micro mirror device 82. The digital micro mirror device 82 is composed of a multiple of micro mirrors (pixels) arranged in a plane, and modulate the incident light by switching the respective reflection angles of the micro mirrors in two directions, so as to functions as a light-modulating unit. The light emitted by the digital micro mirror device 82 passes the projection optical system 83, is reflected by the aspherical mirror 84 and is projected in an enlarged scale onto the screen 85 from the back side.

In the rear projection apparatus, the aperture driving apparatus 10 (11, 12) is disposed in the projection optical system 83, and is used to adjust the amount of light (i.e., image light) emitted by the digital micro mirror device 82 toward the screen 85. Since the amount of light is adjusted by the aperture driving apparatus 10 (11, 12), it becomes possible to correctly project an image ranging from a bright scene to a dark scene.

The aperture driving apparatuses described in Embodiments 1 through 3 can also be applied to other projection type image display apparatus than those described in Embodiments 4 and 5, but also. Further, the aperture driving apparatuses described in Embodiments 1 through 3 can be used for adjusting the amount of light in an apparatus (for example, an imaging apparatus) other than the projection type image display apparatus.

Further, in the above described Embodiments 1 through 3, the aperture plate 1 is formed as a member separate from the swing arm 2 (22 and 32). However, the aperture plate 1 can be formed integrally with the swing arm 2 (22 and 32).

Furthermore, in the above described closed-loop control system (FIG. 6), it is also possible to use other evaluation value than the luminance value for determining the swing amount by which the swing arm is to be swung.

While the preferred embodiments of the present invention have been illustrated in detail, it should be apparent that modifications and improvements may be made to the invention without departing from the spirit and scope of the invention as described in the following claims.

What is claimed is:

1. An aperture driving apparatus comprising:
   a swing unit and a stationary unit, wherein:
      said swing unit comprises:
         an aperture plate that partially blocks a light;
         a coil that is a part of a voice coil motor for obtaining a driving force for driving said aperture driving plate, and
         a swing arm that supports said aperture plate and said coil, and has a bearing portion between said aperture plate and said coil, and
      said stationary unit comprises:
         a swing shaft that engages said bearing portion and swingably supports said swing arm about a swing axis, and
         a magnet and a yoke that constitute said voice coil motor together with said coil, said magnet applying said driving force to said coil;
   an angle sensor that detects the swing angle of said swing arm;
   an evaluating unit that determines an evaluation value used for determining the swing angle by which said swing arm is to be swung; and
   a control unit that determines the swing angle by which said swing arm is to be swung according to an output of said angle sensor and said evaluation value, to thereby control the swing angle of said swing arm using a closed-loop control technique, wherein, in the direction of said swing axis, the position of a center of gravity of said swing unit is substantially aligned with a position at which said driving force is applied to said coil, and wherein said magnet is disposed on only one side of said coil in the direction of said swing axis, such that the position at which said driving force is applied to said coil is displaced from the center of said coil toward said one side in the direction of said swing axis.

2. The aperture driving apparatus according to claim 1, wherein said bearing portion of said swing arm includes a bearing and a bearing mounting portion to which said bearing is mounted, and wherein, in said bearing mounting portion, said bearing is mounted to a portion protruding to the side on which said magnet is disposed.

3. The aperture driving apparatus according to claim 2, wherein said bearing is made of metal.

4. The aperture driving apparatus according to claim 1, wherein a balancer is mounted to said swing arm on the side on which said magnet is disposed in the direction of said swing axis, said balancer being provided for substantially aligning said position of said center of gravity with said position at which said driving force is applied to said coil in the direction of said swing axis.

5. The aperture driving apparatus according to claim 4, wherein said balancer is a cylindrical member mounted to said swing arm in the vicinity of said swing axis.

6. The aperture driving apparatus according to claim 1, wherein a portion of said swing arm from said bearing portion to said aperture plate protrude to the side on which the magnet is disposed.

7. The aperture driving apparatus according to claim 1, wherein said coil includes first and second coil parts extending perpendicular to said swing axis and facing each other in the direction of said swing axis;

wherein said first coil part is closer to said magnet than said second coil part is, and wherein said position at which said driving force is applied to said coil is in said first coil part.

8. The aperture driving apparatus according to claim 7, wherein said yoke includes a center yoke disposed between said first and second coil parts, and a back yoke disposed to sandwich said magnet with said first coil part.

9. A projection type image display device comprising:

said aperture driving apparatus according to claim 1;

a light modulating unit that modulates said light whose amount is adjusted by said aperture driving apparatus, in accordance with image information, and a projection unit that projects said light modulated by said light modulating unit.

* * * * *